US012780181B1

(12) United States Patent
Nahidi et al.

(10) Patent No.: US 12,780,181 B1
(45) Date of Patent: Nov. 3, 2026

(54) ADAPTIVE VEHICLE STEER-BY-WIRE, TIRE CAMBER, AND RIDE-HEIGHT SUSPENSION SYSTEMS FOR ENHANCED TRACTION STEER MITIGATION

(71) Applicant: GM GLOBAL TECHNOLOGY OPERATIONS LLC, Detroit, MI (US)

(72) Inventors: Seyedeh Asal Nahidi, North York (CA); Raed N. Abuaita, Fenton, MI (US); Amin Habibnejad Korayem, Markham (CA); Robert P. Marble, White Lake, MI (US); Brian K. Saylor, South Lyon, MI (US); Ibrahim A. Badiru, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 19/226,568

(22) Filed: Jun. 3, 2025

(51) Int. Cl.
*B60W 30/045* (2012.01)
*B60W 10/20* (2006.01)
(Continued)

(52) U.S. Cl.
CPC .......... *B60W 30/045* (2013.01); *B60W 10/20* (2013.01); *B60W 10/22* (2013.01); *B60W 40/076* (2013.01); *B60W 40/109* (2013.01); *B60W 40/114* (2013.01); *B60W 50/0097* (2013.01); *G06V 20/588* (2022.01);
(Continued)

(58) Field of Classification Search
CPC .... B60W 30/045; B60W 10/20; B60W 10/22; B60W 40/076; B60W 40/109; B60W 40/114; B60W 50/0097; B60W 2050/0022; B60W 2050/0031; B60W 2420/403; B60W 2520/06; B60W 2520/10; B60W 2520/12;
(Continued)

(56) References Cited

U.S. PATENT DOCUMENTS 8,051,687 B2 11/2011 De Carteret
8,571,759 B2 10/2013 Oblizajek
(Continued)

FOREIGN PATENT DOCUMENTS

DE 102010013178 A1 12/2010
DE 102017210410 A1 12/2018
DE 112020007203 T5 5/2023

*Primary Examiner* — Hai H Huynh
(74) *Attorney, Agent, or Firm* — Quinn IP Law

(57) ABSTRACT

A method of operating a motor vehicle includes a vehicle controller using a digital road map and/or a resident camera module to estimate a lateral tilt angle of a roadway segment forward of the vehicle. The controller predicts a lateral acceleration and yaw moment of the roadway segment using the lateral tilt angle and respective lateral forces on the vehicle's wheel assemblies; a traction steer event is detected when the predicted lateral acceleration and/or yaw moment exceed respective acceleration and yaw thresholds. Upon forecasting traction steer, the controller calculates one or more vehicle control actions designed to redress traction steer using an optimization function that minimizes a discrepancy between predicted and desired lateral accelerations and a discrepancy between predicted and desired yaw moments. In response to the forecasted traction steer event, a resident steer-by-wire system, adjustable ride-height system, and/or adaptive wheel camber system execute(s) the vehicle control action(s).

20 Claims, 3 Drawing Sheets

(51) Int. Cl.

| | |
|---|---|
| ***B60W 10/22*** | (2006.01) |
| ***B60W 40/076*** | (2012.01) |
| ***B60W 40/109*** | (2012.01) |
| ***B60W 40/114*** | (2012.01) |
| ***B60W 50/00*** | (2006.01) |
| ***G06V 20/56*** | (2022.01) |

(52) U.S. Cl.

CPC ............... *B60W 2050/0022* (2013.01); *B60W 2050/0031* (2013.01); *B60W 2420/403* (2013.01); *B60W 2520/06* (2013.01); *B60W 2520/10* (2013.01); *B60W 2520/12* (2013.01); *B60W 2520/125* (2013.01); *B60W 2520/14* (2013.01); *B60W 2520/20* (2013.01); *B60W 2530/10* (2013.01); *B60W 2552/20* (2020.02); *B60W 2552/30* (2020.02); *B60W 2552/53* (2020.02); *B60W 2556/40* (2020.02); *B60W 2710/207* (2013.01); *B60W 2710/22* (2013.01)

(58) Field of Classification Search

CPC ....... B60W 2520/125; B60W 2520/14; B60W 2520/20; B60W 2530/10; G06V 20/588

USPC ......... 701/37, 38, 39, 40, 41, 42, 43, 44, 48

See application file for complete search history.

(56) References Cited

U.S. PATENT DOCUMENTS

| | | | | |
|---|---|---|---|---|
| 10,496,102 | B2 | 12/2019 | Riefe | |
| 12,485,966 | B1 * | 12/2025 | Marble .................. | B62D 17/00 |
| 2019/0351942 | A1 | 11/2019 | de Paula Eduardo | |
| 2020/0148260 | A1 * | 5/2020 | Wu ................. | B60W 30/18163 |
| 2020/0269920 | A1 | 8/2020 | Millsap | |
| 2024/0399811 | A1 * | 12/2024 | Saylor ..................... | B60G 17/06 |
| 2025/0375994 | A1 * | 12/2025 | Saylor ................ | B60G 17/0165 |
| 2026/0109395 | A1 * | 4/2026 | Kwon .................. | B62D 5/0424 |

* cited by examiner

ADAPTIVE VEHICLE STEER-BY-WIRE, TIRE CAMBER, AND RIDE-HEIGHT SUSPENSION SYSTEMS FOR ENHANCED TRACTION STEER MITIGATION

INTRODUCTION

The present disclosure relates generally to steering and suspension systems of motor vehicles. More specifically, aspects of this disclosure relate to smart vehicle systems for the detection and compensation of a traction steer event.

Current production motor vehicles, such as the modern-day automobile, are originally equipped with a steering system that enables a driver to maintain a desired course for the vehicle while controlling directional changes of the vehicle. Most vehicle steering systems utilize a hand-operated steering wheel that is manipulated by the driver to input a desired direction of travel for the vehicle. The steering wheel is mounted via a central hub to a steering column assembly that interconnects the steering wheel with the vehicle's road wheel steering mechanism, the most common of which is the rack-and-pinion steering assembly. In this architecture, a pinion gear at a bottom end of a steering shaft intermeshes with a linear gear bar, known as a "rack." When the steering wheel is rotated, the pinion gear spins with the rotating steering shaft, causing the rack to move rectilinearly along a transverse plane of the vehicle. A tie rod at each end of the rack is connected to the steering arm of a wheel spindle; the moving rack and tie rod pivot the spindle to thereby turn the road wheel. Driver input may be augmented with electric, hydraulic, or pneumatic Power Assisted Steering (also referred to as "PAS" or, more commonly, "power steering") to introduce supplemental energy to the steering mechanism and thereby reduce driver effort.

Some contemporary vehicle steering systems eliminate any direct mechanical linkage between the steering wheel and the road wheels, typically removing the steering column and shaft couplings and replacing these linkages with electro-mechanical components and a human-machine interface (HMI) in what is referred to as a "steer-by-wire" (SBW) system. One such SBW system employs a steering wheel position sensor that monitors the position, displacement, and turning rate of the steering wheel. A dedicated steering system control module translates these inputs into corresponding wheel unit displacement, position, and rate values for turning of the vehicle's road wheels. The steering system control then outputs command signals to a steering actuator motor that swivels the vehicle road wheels in response to the command signals. To convey a sense of "road feel" to the driver, the steer-by-wire system may incorporate tactile transducers, linear actuators, resistive brakes, and/or stepper motors which, controlled by the electronic steering controller, effects controllable feedback during operation of the vehicle.

Modern-day automobiles are also equipped with a suspension system that facilitates vehicle road handling and occupant ride quality by absorbing road-borne shocks and vibrations while maintaining contact between the vehicle's wheel assemblies and the road. A vehicle wheel assembly is a pneumatic apparatus with a synthetic-rubber tire that is fitted onto the outer rim ("barrel") of a metallic wheel unit. To ensure consistent road handling, steering, and braking, the wheel assembly is connected via the wheel unit's central wheel face (e.g., spokes and center disc) to the vehicle chassis through the collaboration of springs, shock absorbers, and linkages of the vehicle suspension system. For instance, a front corner module of a conventional rear-wheel drive automobile employs a steering knuckle with a spindle onto which a hub and a brake rotor are rotatably mounted. Inboard contact points of the knuckle are coupled to the vehicle body, e.g., via a control arm, sway bar, strut damper, and tie rod, whereas the outboard end is coupled to the wheel unit, e.g., via the spindle and hub. The wheel unit rotates and steers on the knuckle, spindle, and tie rod, while being held in a stable plane of motion by the knuckle, strut, and spring.

During operation of a motor vehicle, the road wheel assemblies may experience a measurable change in their tracking "toe" angle that is caused by differences in traction between the port and starboard sides of the vehicle. For instance, "traction steer" is an unintended vehicle steering event that results from an inequality between surface friction forces on the two front tires, occurring most frequently under high drive torques when accelerating through a turn. Drive torque tends to pull the vehicle and, thus, the steering wheel toward the inside of the turn due to uneven left-versus-right tire tractive forces. Traction steer may also occur during vehicle acceleration in a straight line on an uneven road surface, for example, if the steering wheel is alternately pulled left and right due to rapidly changing tire loads. Drive torque is reacted as a force on the wheel spindle, which generates a kingpin moment that is proportional to a tractive force and a spindle length. As drive torque and tire longitudinal slip increase, tire restoring moments are reduced, making the phenomenon more evident. The unintended steering effects of traction steer may be further exacerbated by surfaces with varying friction, such as icy, wet, or uneven roads.

SUMMARY

Presented herein are smart vehicle systems with attendant control logic for forecasting and mitigating traction steer, methods for manufacturing and methods for operating such systems, and motor vehicles equipped with such systems. By way of example, and not limitation, an adaptive vehicle steer-by-wire, tire camber, and ride-height suspension system is disclosed for enhanced traction steer mitigation. The system uses advanced control logic for predictive estimation of road crown angle or road bank angle (collectively "lateral tilt angle") to proactively predict unwanted vehicle yaw moments and lateral acceleration that may arise during a high vehicle acceleration/deceleration event. In response to forecasting a marked lateral tilt angle with consequent lateral acceleration and yaw motions on an uneven road-indicating more tire grip on one side of a subject "host" vehicle than the other-real-time smart vehicle controls automate execution of one or more predefined remediating actions to prevent or reduce traction steer. Depending on available vehicle hardware, a Power Steering Control Module (PSCM) may adjust front and/or rear steering to apply a corrective steering input to counter any unintended steering effects. Optionally, a Suspension Control Module (SCM) may increase or decrease respective tire cambers to increase lateral grip, and may lower a ride height on a high-friction side of the vehicle to shift additional weight in that direction to enhance traction symmetry.

Aspects of this disclosure are directed to smart vehicle systems and system control logic for proactively predicting and mitigating traction steer events. In an example, a method is presented for operating a motor vehicle with multiple road wheel assemblies rotatably attached to a vehicle body. This representative method includes, in any order and in any combination with any of the above and below disclosed options and features: estimating, e.g., via a resident or remote microprocessor, central controller, control module, programmable logic circuit (PLC), integrated circuit (IC) device, or network of processors/controllers/modules/circuits/devices (collectively "vehicle controller") using a digital road map (e.g., cache-memory-stored open street map) and/or a camera module (vehicle-mounted camera array), a lateral tilt angle of a roadway segment forward of the subject vehicle; predicting, e.g., via the vehicle controller, a lateral acceleration and yaw moment of the roadway segment using the lateral tilt angle and respective lateral forces on the vehicle's wheel assemblies; forecasting, e.g., via the vehicle controller, a traction steer event on the roadway segment forward of the subject vehicle when the predicted lateral acceleration and/or predicted yaw moment exceed respective preset acceleration and yaw thresholds; calculating, e.g., via the vehicle controller responsive to forecasting traction steer, one or more vehicle control actions designed to redress traction steer using a mathematical optimization function that minimizes a discrepancy between predicted and desired lateral accelerations and a discrepancy between predicted and desired yaw moments; and commanding, e.g., via the vehicle controller responsive to forecasting the traction steer event, an automated steer-by-wire (SBW) system, an adjustable ride-height (ARH) system, and/or an adaptive wheel camber (AWC) system of the motor vehicle to execute the vehicle control action(s).

Aspects of this disclosure are also directed to computer-readable media (CRM) containing controller-executable instructions for actively predicting and mitigating traction steer events. In an example, a non-transient CRM stores instructions that are executable by a vehicle controller of a motor vehicle, which has a vehicle body with multiple wheel assemblies rotatably attached to the vehicle body. These CRM-stored instructions, when executed, cause the vehicle controller to perform operations that include: estimating, using a digital road map and/or a camera module attached to the vehicle body, a lateral tilt angle of a roadway segment forward of the motor vehicle; predicting a predicted lateral acceleration and a predicted yaw moment of the roadway segment using the lateral tilt angle and respective lateral forces on the wheel assemblies; forecasting a traction steer event on the roadway segment forward of the motor vehicle when the predicted lateral acceleration exceeds a preset acceleration threshold and/or the predicted yaw moment exceeds a preset yaw threshold; calculating, responsive to forecasting the traction steer event, a vehicle control action configured to redress the traction steer event using a mathematical optimization function that minimizes a first discrepancy between the predicted lateral acceleration and a desired lateral acceleration and a second discrepancy between the predicted yaw moment and a desired yaw moment; and commanding, responsive to forecasting the traction steer event, an automated steer-by-wire system, an adjustable ride-height system, and/or an adaptive wheel camber system of the motor vehicle to perform the vehicle control action.

Additional aspects of this disclosure are directed to motor vehicles equipped with enhanced traction steer prediction and mitigation systems. As used herein, the terms "vehicle" and "motor vehicle" may be used interchangeably and synonymously to reference any relevant vehicle platform, such as passenger vehicles, commercial vehicles, industrial vehicles, off-road and all-terrain vehicles, farm equipment, aircraft, spacecraft, etc. In an example, a motor vehicle includes a vehicle body with a passenger cabin, multiple road wheel assemblies attached to the vehicle body (e.g., via wheel corner modules coupled to a unibody or body-on-frame chassis), and other standard original equipment. A prime mover, which may be in the nature of an electric traction motor and/or an internal combustion engine (ICE) assembly, is located inside the vehicle body and drives the road wheel(s) to thereby propel the vehicle. Also attached to the vehicle body are a SBW system that is operable to modify a steering angle of the wheel assemblies, an ARH system that is operable to modify a respective ride height of each wheel assembly, and an AWC system that is operable to modify a respective camber angle of each wheel assembly. Some vehicle makes/models/trims may only include one or two of the foregoing systems.

Continuing with the discussion of the foregoing example, the vehicle is also equipped with a resident or remote vehicle controller that is programmed to retrieve a digital road map from a resident or remote memory device and/or image data from a camera module attached to the vehicle body, and estimate a lateral tilt angle of a roadway segment forward of the vehicle using the digital road map and/or image data. The controller also determines a respective lateral force on each wheel assembly, and then predicts a lateral acceleration and yaw moment of the forward roadway segment using the lateral tilt angle and the wheel-borne lateral forces. A traction steer event is predicted on the roadway segment forward of the vehicle when either or both the predicted lateral acceleration or the predicted yaw moment exceeds their respective preset acceleration/yaw thresholds. Responsive to the forecasted traction steer, the controller uses a mathematical optimization function, which minimizes a discrepancy between predicted and desired lateral accelerations and a discrepancy between predicted and desired yaw moments, to calculate one or more vehicle control actions that are designed to redress traction steer. In response to forecasting the traction steer event, the controller commands the SBW system, the ARH system, and/or the AWC system to perform the vehicle control action(s).

For any of the disclosed methods, CRM, and vehicles, estimating the lateral tilt angle may include: detecting lane markings in a digital image of the roadway segment captured by the camera module; converting pixel coordinates of the lane markings in the digital image into world coordinates using an inverse perspective mapping (IPM) computer vision technique; and fitting a parabolic equation to the world coordinates of the lane markings, the parabolic equation defining a coefficient of curvature a based on a lateral coordinate x and a vertical coordinate y in the world coordinates. Estimating the lateral tilt angle may include calculating a lateral tilt angle $\theta_c$ as:

$$\theta_c = \tan^{-1}\left(\frac{dx}{dz}\right)$$

which is a function of a lateral displacement increment dx of a lane midpoint of the roadway segment, and a vertical displacement increment dz of the roadway segment. Estimating the roadway segment's lateral tilt angle may also include using a Kalman filter to fuse the calculated lateral tilt angle $\theta_c$ with road curvature data of the roadway segment that is contained in the digital road map.

For any of the disclosed methods, CRM, and vehicles, predicting the lateral acceleration and yaw moment of the forward roadway segment may include calculating a predicted lateral acceleration $a_{y,pred}$ and a predicted yaw moment $r_{pred}$ as:

$$a_{y,pred} = (F_{y,fl} + F_{y,fr} + F_{y,rl} + F_{y,rr} + g\sin\theta_c)/m$$

$$r_{pred} = (F_{y,fl}L_f - F_{y,fr}L_r + F_{y,rl}L_r - F_{y,rr}L_r + mgh_{CG}\sin\theta_c)/I_z$$

which is a function of the lateral tilt angle $\theta_c$, gravity g, a vehicle mass m of the motor vehicle, a first distance $L_r$ from the motor vehicle's center of gravity (CG) of its rear axle, a second distance $L_f$ from the vehicle's CG to its front axle, first, second, third and fourth lateral forces $F_{y,fl}$, $F_{y,fr}$, $F_{y,rl}$ and $F_{y,rl}$ of front-left, front-right, rear-left, and rear-right wheels of the vehicle's wheel assemblies, a height $h_{CG}$ of the CG, and is a moment of inertia $I_z$ of the motor vehicle. The mathematical optimization function may be calculated:

$$J = \sum \min\left(\|a_{y,pred} - a_{y,des}\|^2_{W_{a_y}} + \|r_{pred} - r_{des}\|^2_{W_r} + \|\Delta h_{fl}\|^2_{W_{\Delta h_{fl}}} + \|\Delta h_{fr}\|^2_{W_{\Delta h_{fr}}} + \|\Delta h_{rl}\|^2_{w_{\Delta h_{rl}}} + \|\Delta h_{frr}\|^2_{W_{\Delta h_{rr}}}\right)$$

subject to constraints:

$$\Delta h_{min} \leq \Delta h_{fl}, \Delta h_{fr}, \Delta h_{rl}, \Delta h_{rr} \leq \Delta h_{max} \text{ (physical ride height limits), and}$$

$$|\Delta h_{fl} - \Delta h_{rl}|, |\Delta h_{fr} - \Delta h_{rr}|, |\Delta h_{fl} - \Delta h_{fr}|,$$

$$|\Delta h_{rl} - \Delta h_{rr}| \leq \text{max asymmetry constraints (roll and pitch)}$$

in which $a_{y,des}$ is the desired lateral acceleration, $r_{des}$ is the desired yaw moment, and $W_{a_y}$' $W_r$, $W_{\Delta h_{fl}}$, $W_{\Delta h_{fr}}$, $W_{\Delta h_{rl}}$, $W_{\Delta h_{rr}}$ are optimization weights associated with lateral acceleration, yaw rate, and the ride heights of the front-left, front-right, rear-left, and rear-right wheel assemblies in the objective function, respectively.

For any of the disclosed methods, CRM, and vehicles, the vehicle controller may also calculate a first normal force $F_{z,f}$ of a front axle of the motor vehicle and a second normal force $F_{z,r}$ of a rear axle of the motor vehicle as:

$$F_{z,f} = \frac{\text{mg cos } \theta_c L_r}{L} - \frac{ma_x h_c}{L}$$

$$F_{z,r} = \frac{\text{mg cos } \theta_c L_f}{L} + \frac{ma_x h_c}{L}$$

which is a function of the lateral tilt angle $\theta_c$, gravity g, the vehicle mass m of the motor vehicle, the distance $L_r$ from the vehicle's CG to its rear axle, the distance $L_f$ from the vehicle's CG to its front axle, the height $h_c$ of CG, and a forward acceleration $a_x$ of the motor vehicle. The controller may also calculate first, second, third and fourth normal forces $F_{z,fl}$, $F_{z,fr}$, $F_{z,rl}$ and $F_{z,rl}$, respectively, of the motor vehicle's front-left, front-right, rear-left, and rear-right wheel assemblies as:

$$F_{z,fl} = \left(F_{z,f} - \frac{ma_y h_c}{t}\right)/2$$

$$F_{z,fr} = \left(F_{z,f} + \frac{ma_y h_c}{t}\right)/2$$

-continued $$F_{z,rl} = \left(F_{z,r} - \frac{ma_y h_c}{t}\right)/2$$

$$F_{z,rr} = \left(F_{z,r} + \frac{ma_y h_c}{t}\right)/2$$

in which t is a trackwidth of the roadway segment, and $a_y$ is a lateral acceleration of the motor vehicle. The vehicle controller may then calculate first, second, third and fourth lateral forces $F_{y,fl}$, $F_{y,fr}$, $F_{y,rl}$ and $F_{y,rl}$ of front-left, front-right, rear-left, and rear-right wheels of the wheel assemblies of the motor vehicle as:

$$F_{y_{fl}} = \mu_s \mu_{y,fl} F_{z,fl,c} + \overline{C}_{\alpha f} \Delta\alpha_f + \overline{C}_{\gamma f} \Delta\gamma_{fl}$$

$$F_{y_{fr}} = \mu_s \mu_{y,fr} F_{z,fr,c} + \overline{C}_{\alpha f} \Delta\alpha_f + \overline{C}_{\gamma f} \Delta\gamma_{fr}$$

$$F_{y_{rl}} = \mu_s \mu_{y,rl} F_{z,rl,c} + \overline{C}_{\alpha r} \Delta\alpha_r + \overline{C}_{\gamma r} \Delta\gamma_{rl}$$

$$F_{y_{rr}} = \mu_s \mu_{y,rr} F_{z,rr,c} + \overline{C}_{\alpha r} \Delta\alpha_r + \overline{C}_{\gamma r} \Delta\gamma_{rr}$$

in which $\overline{C}_{\alpha f}$ is a front cornering coefficient, $\overline{C}_{\gamma f}$ is a front camber coefficient, $\overline{C}_{\alpha r}$ is a rear cornering coefficient, $\overline{C}_{\gamma r}$ is a rear camber coefficient, $\alpha_f$ is a front lateral slip angle, $\alpha_r$ is a rear lateral slip angle, $\gamma_{fl}$ is a front left camber angle, $\gamma_{fr}$ is a front right camber angle, $\gamma_{rl}$ is a rear left camber angle, and $\gamma_{rr}$ is a rear right camber angle.

For any of the disclosed methods, CRM, and vehicles, the vehicle controller may also calculate: a first estimated lateral tilt angle using inertial measurement unit (IMU) data received from an IMU device attached to the vehicle body 11; a second estimated lateral tilt angle using rack force data received from load sensor of a steering rack of the motor vehicle; and an adjusted lateral tilt angle based on a weighted cross error calculation of the lateral tilt angle, the first estimated lateral tilt angle, and the second estimated lateral tilt angle. The vehicle controller may also calculate a front slip $\Delta\alpha_f$ of the vehicle's front axle and a rear slip $\Delta a_r$ of the vehicle's rear axle:

$$\Delta\alpha_f = \left(\frac{v_y + L_f r}{v_x} - \delta_f\right) - \left(\frac{v_y + L_f r}{v_x} - (\delta_f + \Delta\delta_f)\right)$$

$$\Delta\alpha_r = \left(\frac{v_y - L_r r}{v_x} - \delta_r\right) - \left(\frac{v_y - L_r r}{v_x} - (\delta_r + \Delta\delta_r)\right)$$

where $v_x$ is a longitudinal speed, $v_y$ is a lateral speed, $\delta_f$ is a front steering angle, and $\delta_r$ is a rear steering angle. In this instance, the mathematical optimization function for calculating the vehicle control action includes:

$$J = \sum \min\Big(\|a_y - a_{y,des}\|^2_{W_{\alpha_y}} + \|r - r_{des}\|^2_{W_r} + \|\Delta h_{fl} - \Delta h_{fl,ref}\|^2_{W_{\Delta h_{fl}}} + \|\Delta h_{fr} - \Delta h_{fr,ref}\|^2_{W_{\Delta h_{fr}}} + \|\Delta h_{rl} - \Delta h_{rl,ref}\|^2_{W_{\Delta h_{rl}}} + \|\Delta h_{frr} - \Delta h_{frr,ref}\|^2_{W_{\Delta h_{rr}}} + \|\Delta\delta_f\|^2_{W_{\Delta\delta_f}} + \|\Delta\delta_r\|^2_{w_{\Delta\delta_r}} + \|\Delta\gamma_{fl}\|^2_{W_{\Delta\gamma_{fl}}} + \|\Delta\gamma_{fr}\|^2_{W_{\Delta\gamma_{fr}}} + \|\Delta\gamma_{rl}\|^2_{w_{\Delta\gamma_{rl}}} + \|\Delta\gamma_{rr}\|^2_{w_{\Delta\gamma_{rr}}}\Big)$$

and is subject to constraints:

$$\Delta\delta_{f,min} \le \Delta\delta_f \le \Delta\delta_{f,max} \text{ (physical front steering road angle limits)}$$

$$\Delta\delta_{r,min} \le \Delta\delta_r \le \Delta\delta_{r,max} \text{ (physical rear steering road angle limits)}$$

$$\Delta h_{min} \le \Delta h_{fl}, \Delta h_{fr}, \Delta h_{rl}, \Delta h_{rr} \le \Delta h_{max} \text{ (physical ride height limits)}$$

$$\Delta\gamma_{min} \le \Delta\gamma_{fl}, \Delta\gamma_{fr}, \Delta\gamma_{rl}, \Delta\gamma_{rr} \le \Delta\gamma_{max} \text{ (physical ride height limits)}$$

$$|\Delta h_{fl} - \Delta h_{rl}|, |\Delta h_{fr} - \Delta h_{rr}|, |\Delta h_{fl} - \Delta h_{fr}|, |\Delta h_{rl} - \Delta h_{rr}| \le \text{max asymmetry constraint (pitch and roll)}$$

$$|\Delta\gamma_{fl} - \Delta\gamma_{fr}|, |\Delta\gamma_{rl} - \Delta\gamma_{rr}| \le \text{max asymmetry constraint (handling)}$$

where $W_{\Delta\delta_f}=0$ represents a vehicle configuration that only has a rear steer-by-wire available and $W_{\Delta\delta_r}=0$ represents a vehicle configuration that only has a front steer-by-wire available. As another option, the vehicle control action may include: the ARH system modifying respective ride heights on the vehicle's wheel assemblies to transfer vehicle load from one wheel assembly (e.g., port side of vehicle) to another wheel assembly (e.g., starboard side of vehicle); the SBW system applying a steering angle correction to a steering angle of the vehicle's wheel assemblies; and/or the AWC system applying respective camber angle corrections to respective camber angles of the wheel assemblies.

The above summary does not represent every embodiment or every aspect of the present disclosure. Rather, the foregoing summary provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
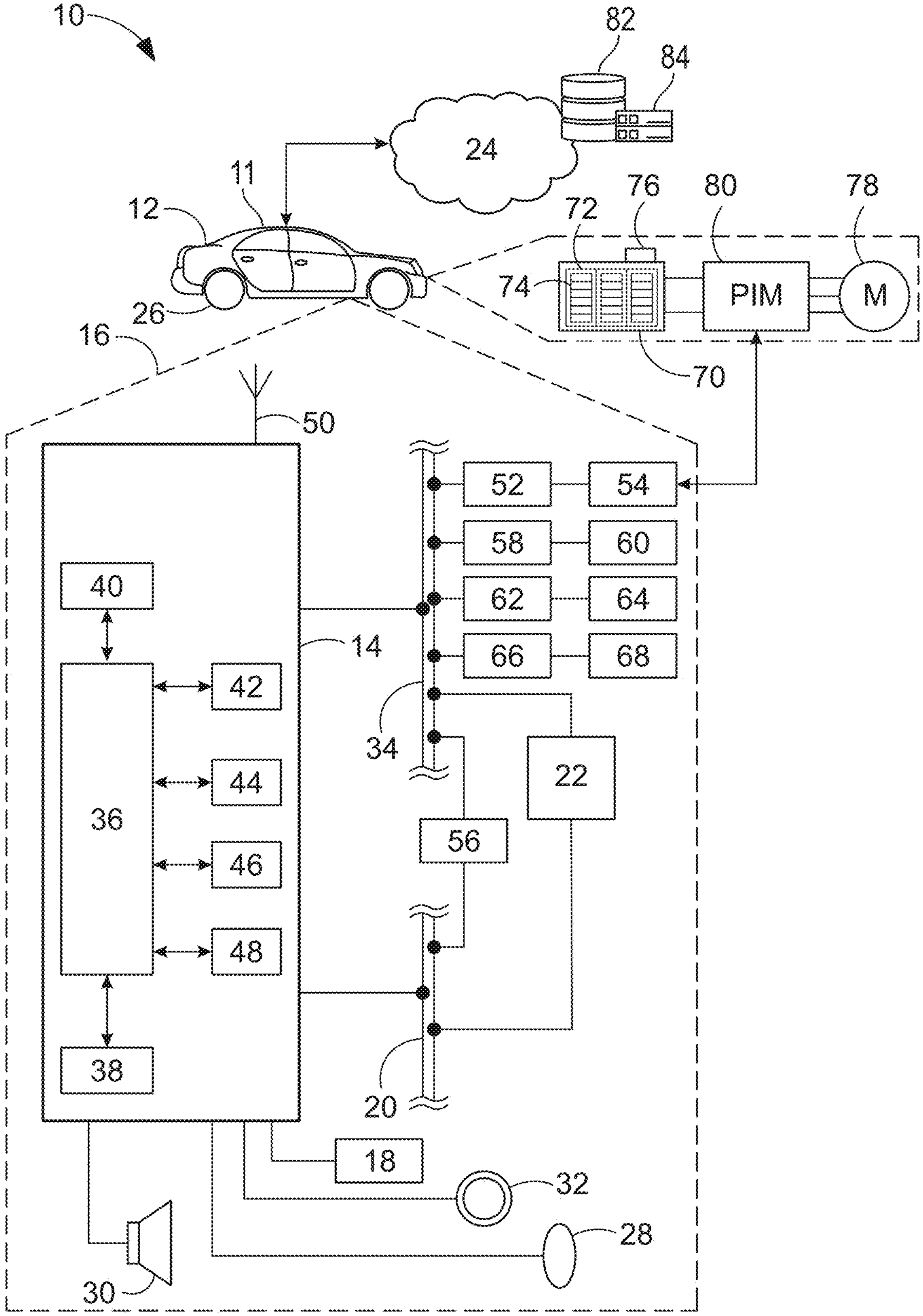
FIG. 1 is a partially schematic, side-view illustration of a representative motor vehicle with adaptive steer-by-wire, ride-height suspension, and wheel camber systems along with a network of in-vehicle controllers, sensors, and communication devices for provisioning traction steer mitigation in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at or nearly at" or "same or practically the same" or "within 0-5% of" or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, implementation of the present concepts using the specific automated steer-by-wire (SBW), adjustable ride-height (ARH), and/or adaptive wheel camber (AWC) architectures presented in the drawings should also be appreciated as a non-limiting application of disclosed features. As such, it will be understood that novel aspects of this disclosure may be implemented by other vehicle suspension and steering system architectures and may be incorporated into any logically relevant type of motor vehicle. Moreover, only select components of the motor vehicle and the steering/suspension subsystems are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and informatics ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, dials, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 is equipped with an embedded voice-processing unit with audio filtering, editing, and analysis modules. Conversely, each speaker 30 provides audible output to a vehicle occupant and may be either a stand-alone speaker dedicated to the telematics unit 14 or may be part of an in-cabin audio system 22. The audio system 22 is connected to a network connection interface 34 and an audio bus 20 to receive analog and digital signals, rendering it as sound, via one or more audio speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle suspension and steering, and other automated functions. For instance, telematics unit 14 may exchange signals with a Powertrain Control Module (PCM) 52, an Advanced Driver Assistance System (ADAS) module 54, a Steering Control Module (SCM) 56, a Suspension Control Module (SCM) 58, a Sensor System Interface Module (SSIM) 60, and assorted other vehicle ECUs, such as an Engine Control Module (ECM), a Motor Control Module (MCM), a Brake System Control Module (BSCM), a Body Control Module (BCM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, solid-state drive (SSD) memory, hard-disk drive (HDD) memory, phase-change memory (PCM), flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), a wireless modem, or a mobile hotspot, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual RF antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automated vehicle operation.

To propel the automobile 10, a vehicle powertrain is operable to generate and deliver tractive torque to one or more of the vehicle's drive wheels 26. The powertrain is represented in FIG. 1 by an electric traction motor (M) 78 that is operatively connected to a rechargeable energy storage system (RESS), which may be in the nature of a chassis-mounted traction battery pack 70. The traction battery pack 70 is generally composed of one or more battery modules 72 each containing a cluster of battery cells 74, such as lithium-class, zinc-class, nickel-class, or organosilicon-class cells of the pouch, prismatic, or cylindrical type. One or more prime movers, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

During operation of the motor vehicle 10, differences in traction between the port-side (left) and starboard-side (right) road wheels may cause unintended steering effects in a phenomenon referred to as "traction steer". A traction steer event oftentimes occurs during vehicle acceleration or deceleration on surfaces with varying friction, such as icy, wet, or uneven roads. Presented herein are control methods and system architectures that utilize controller-automated, adaptive vehicle steer-by-wire and suspension systems to generate an offsetting steering angle and normal force shifts to cancel out undesired lateral motions and minimize traction steer effects. The vehicle control architecture may use integrated front and rear steer-by-wire systems in cooperation with active suspension ride-height and tire-camber control for traction steer mitigation. A non-limiting example of an active vehicle camber control system is presented in U.S. patent application Ser. No. 19/089,518, which was filed on Mar. 25, 2025, is entitled "Suspension Camber Optimization", and is incorporated herein by reference in its entirety and for all purposes.

Enhanced traction steer mitigation may be enabled through predictive road crown/bank angle (lateral tilt angle) estimation that is based on roadway topology data in high-definition (HD) multidimensional road maps and real-time roadway images captured by on-vehicle HD camera modules. To counteract outdated map data or malfunctioning cameras, the system may perform real-time adjustment of the estimated lateral tilt angle based on arbitrated inertial measurement unit (IMU) and steering rack force data. The estimated and adjusted lateral tilt angle may be used to predict a lateral acceleration and yaw moment of the subject roadway forward of the host vehicle; the predicted lateral acceleration and yaw moment are indicative of a traction steer event. An optimization algorithm is used to calculate feedforward ride-height commands and feedback steering and camber adjustment commands for optimal traction steer mitigation. This reconfigurable design enables scalability and adaptability across multiple vehicle platforms, such as those equipped with adjustable ride-height or active-camber suspension control with and without active by-wire front and/or rear steering.

Figure 2:
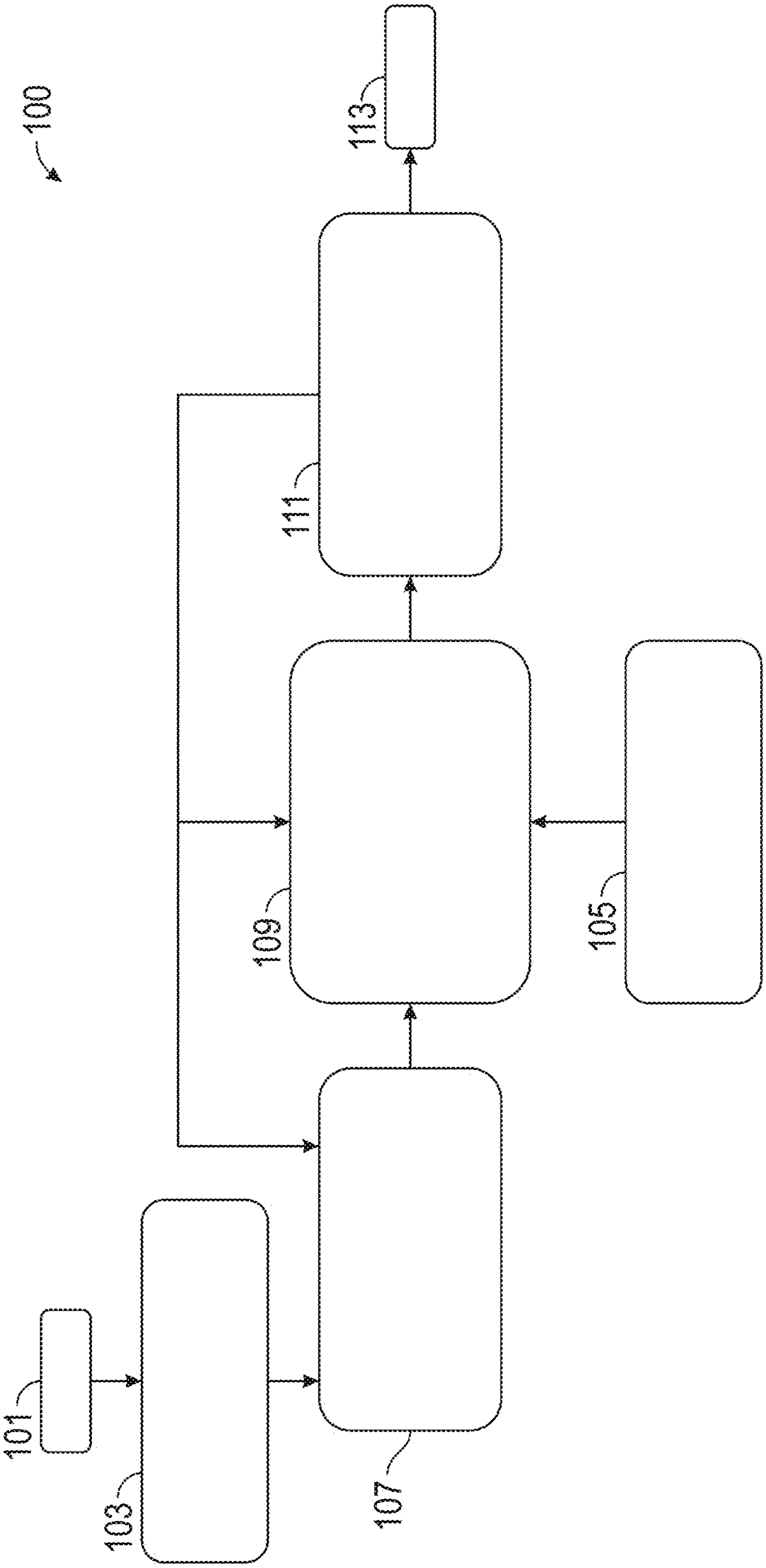
FIG. 2 is a flowchart illustrating a representative host vehicle control protocol for enhanced forecasting and mitigation of traction steer, which may correspond to non-transient, memory-stored instructions that are executable by a resident or remote processor, control module, programmable logic circuit, central controller, or other integrated circuit (IC) device or network of processors/controllers/modules/circuits/devices/etc., in accord with aspects of the present disclosure.
Figure 3:
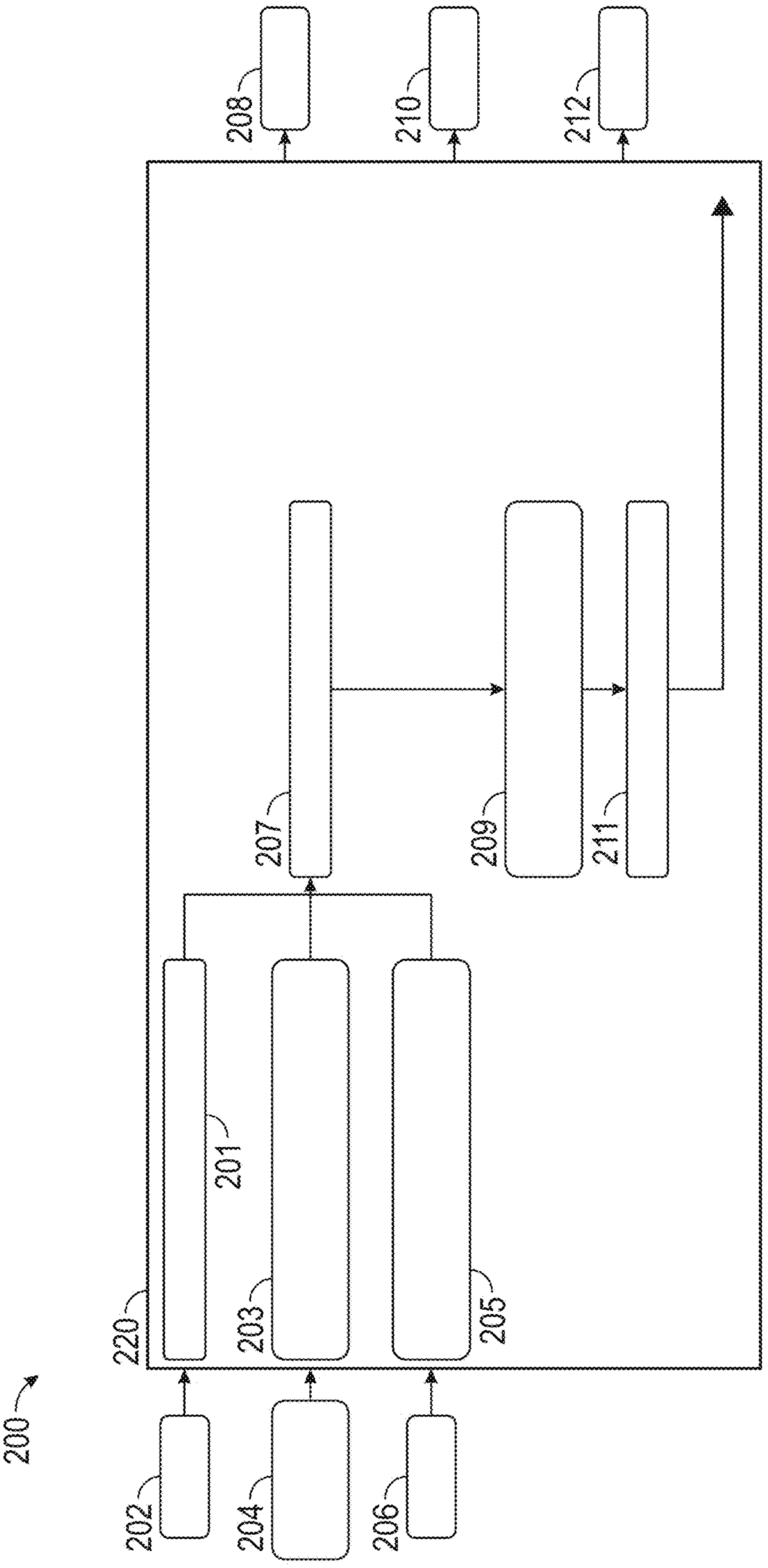
FIG. 3 is a schematic diagram of a representative host vehicle with controller-automated steer-by-wire (SBW), adjustable ride-height (ARH), and adaptive wheel camber (AWC) systems for enhanced traction steer prediction and mitigation in accord with aspects of the present disclosure.

With reference next to the flowchart of FIG. 2, an improved method or control protocol for provisioning enhanced forecasting and mitigation of traction steer of a vehicle, such as automobile 10 of FIG. 1, using an adaptive steering and suspension system, such as controller-automated SBW, ARH, and AWC vehicle architecture 200 of FIG. 3, is generally shown at 100 in accordance with aspects of the present disclosure. Some or all of the operations illustrated in FIG. 2 and described in detail below may be representative of an algorithm that corresponds to non-transitory, processor-executable instructions that may be stored, for example, in main or auxiliary or remote memory (e.g., resident vehicle memory 38 and/or remote cloud service database 82 of FIG. 1). These instructions may be executed by a resident or remote microprocessor, central controller, control module, programmable logic circuit (PLC), integrated circuit (IC) device or network of processors/controllers/modules/circuits/devices (e.g., vehicle CPU 36 and/or server-class cloud computing terminal 84 of FIG. 1) to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 100 may begin at START terminal block 101 of FIG. 2 with memory-stored, computer-readable instructions for initializing a traction steer mitigation protocol for a motor vehicle travelling down a roadway. This routine may be initialized in real-time, near real-time, continuously, systematically, sporadically, and/or at predefined time intervals, for example, each 10 or 100 milliseconds during operation of the motor vehicle 10. As yet another option, terminal block 101 may initialize responsive to a user command prompt (e.g., via telematics input controls 32), a resident vehicle controller prompt (e.g., from CPU 36), or a broadcast prompt signal received from a centralized BO vehicle services system (e.g., from cloud host service 24). By way of non-limiting example, method 100 may automatically initialize as part of a key-on event in which a driver VDI of the vehicle 10 powers on the vehicle powertrain, shifts the powertrain into a drive (D) mode, and commences vehicle launch. Upon completion of some or all of the control operations presented in FIG. 2, method 100 may advance to END terminal block 113 and temporarily terminate or, optionally, may loop back to terminal block 101 and run in a continuous loop. Terminal block 113 may automatically trigger in response to a user shifting the powertrain into a neutral (N) or park (P) mode, or in response to a key-off event in which a user powers off the host vehicle.

After initialization at terminal block 101, method 100 may advance to PVT LATERAL TILT ANGLE process block 103 and predict a crown or bank angle of a roadway segment forward of the motor vehicle. In accord with the example illustrated in FIG. 1, CPU 36 may communicate through SSIM 60 with a forward-facing one of the on-vehicle digital cameras 62 to retrieve therefrom digital images of an upcoming roadway segment. In tandem, CPU 36 may access resident memory device 38 to call-up an open street map with spatial and topological data for the subject roadway segment. The retrieved camera and map data is utilized to proactively predict a crown/bank angle, which may then be used by an active suspension system to modulate respective ride heights and/or camber angles of select ones of the vehicle wheel assemblies for optimized handling in a traction steer event. As will be explained in further detail below, pixel coordinates from the camera-generated digital images are extracted and converted to world coordinates, e.g., using a suitable computer vision technique. A parabolic equation is then fit to lane edge markings of the roadway segment; a tilt angle may be estimated based on the location of the vehicle on the lane markings and predefined HD map information regarding elevation.

A vehicle-mounted camera array and a three-dimensional (3D) HD vector map can be utilized for crown/bank angle estimation. First, a vehicle controller may define a camera coordinate system, including a forward axis (depth) $X_c$, a lateral axis (left-right) $\gamma_c$, and a vertical axis (height) $Z_c$; the lateral tilt angle $\theta$ is the incline of the road relative to the horizontal plane in this coordinate system. Next, the controller identifies lane markings in a digital image of the roadway segment captured by a forward-facing camera module; pixel coordinates of the lane markings in the digital image are then converted into world coordinates using an inverse perspective mapping (IPM) technique. By way of example, pixel positions of the lane markings may be detected using image processing techniques, such as edge detection, Hough transforms, or more sophisticated methods like deep learning-based pixel detection. The controller gathers coordinate pairs (xi, zi), where xi is a pixel position along the horizontal axis and zi is a corresponding pixel position of the lane marking in the vertical axis. The respective pixel coordinates of the roadway's lateral lane edges are converted into world coordinates using an inverse of a projective "homography" transformation matrix. The matrix may be derived by associating pixel coordinates of lane edge points with their corresponding world coordinates, which enables the system to map the observed lane edges in the image to their true positions on the road.

A parabolic equation—$y=ax^2+bx+c$—is then fit to the world coordinates of the lane markings, where a is a coefficient of curvature. An estimated lateral tilt angle is then calculated as:

$$\theta_c = \tan^{-1}\left(\frac{dx}{dz}\right)$$

which is a function of a lateral displacement dx of a lane midpoint of the roadway segment over a vertical displacement dz of the roadway segment. In this instance, the vehicle camera module may detect real-time road conditions, while the HD map or maps may provide pre-stored road profiles; a Kalman filter fuses camera-based lane data with map-based road curvature data to refine crown/bank angle estimates. To find a best-fit parabolic curve, a least-squares fitting method may be used to minimize an error between the observed points and the predicted points from the above parabolic equation. This may involve solving for values of a, b, and c that minimize the sum of squared residuals:

$$\sum_{i=1}^{n}\left(y_i - \left(ax_i^2 + bx_i + c\right)\right)^2$$

The solution to this will provide you with respective values of a, b, and c.

Different estimates of lateral tilt angle may be fused through a cross-error correlation logic using an adaptive weight calculation for real-time adaptation and adjustment of tilt angle estimation indicated at TILE ANGLE ADAPTATION subroutine 105 of FIG. 2. In FIG. 3, for example, real-time fusion of camera-and-map based tilt angle estimates with IMU-based and steering-rack-based tilt angle estimates can enhance the reliability and robustness of the estimation method to remediate outdated map data or faulty vehicle cameras. Real-time vehicle acceleration and rotational speed data may be received by a resident vehicle controller 220 from IMU 202; the controller 220 uses this data to calculate an IMU-based (first) lateral tilt angle estimate $\theta_{IMU}$ at IMU ANGLE ESTIMATION subroutine 201. At the same time, real-time steering rack force data may be received by the vehicle controller 220 from a steering rack load transducer 204; the controller 220 uses this data to calculate a rack-force-based (second) lateral tilt angle estimate $\theta_{rack}$ at RACK ANGLE ESTIMATION subroutine 203. And, as explained above, a front camera module (FCM) 206 generates real-time roadway image data, which is used by the vehicle controller 220 to calculate a camera-based and map-based (third) lateral tilt angle estimate $\theta_{camera}$ at CAM/MAP ANGLE ESTIMATION module 205.

An adjusted lateral tilt angle $\theta_c$ is calculated based on a weighted cross-error calculation 207 of the lateral tilt angle estimate $\theta_{camera}$, the IMU-based tilt angle estimate $\theta_{IMU}$, and the rack-force-based tilt angle estimate $\theta_{rack}$. In FIG. 3, for example, the cross-error calculation 207 outputs the following contingency table error matrix:

$$\begin{vmatrix} 0 & \theta_{IMU}-\theta_{rack} & \theta_{IMU}-\theta_{camera} \\ \theta_{rack}-\theta_{IMU} & 0 & \theta_{rack}-\theta_{camera} \\ \theta_{camera}-\theta_{IMU} & \theta_{camera}-\theta_{rack} & 0 \end{vmatrix}$$

which is an n×n array, where n is the number of classes in the data. A weight adaption function 209 is then performed to adapt matrix weights $W_1$, $W_2$ and $W_3$ based on a correlated error E, or:

$$[W_1\ W_2\ W_3] = f(|E|)$$

Once the matric weights are set, a data fusion procedure 211 is then performed to calculate the adjusted lateral tilt angle $\theta_c$ as:

$$\theta_c = W_1\,\theta_{IMU} + W_2\,\theta_{rack} + W_3\,\theta_{camera}$$

This arbitrated and fused tilt angle estimate may then be used to derive a single or multiple vehicle-calibrated control actions that are individually or collectively designed to redress the effects of traction steer. These control actions are translated into command signal sets that are triaged and transmitted to the host vehicle's resident SBW system 208, ARH system 210, and/or AWC system 212.

Method 100 of FIG. 2 advances from process block 103 to FEEDFORWARD CONTROL subroutine 107 in which a feedforward control module automates operation of an active suspension ride-height system to selectively transfer vehicle load from one axle to another axle (for-aft load redistribution) or from one side to another side (starboard-port load redistribution). In this instance, active load transfer may be modulated to improve vehicle handling control on a crown road or a banked road to prevent or mitigate undesired lateral acceleration and yaw motion that may result from a traction steer event. To generate situation-specific system responses, such as a reference control action with respective ride-height adjustments at each wheel corner, a linear-objective optimization problem may be solved in real-time to minimize discrepancies between a set of vehicle-estimated "predicted" lateral acceleration and yaw moment values and respective vehicle-calibrated "desired" lateral acceleration and yaw moment values. The optimization analysis may be subjective to practical constraints, such as limitations of physical movement of the suspension actuator and maximum tolerable height differences of one corner relative to another considering ride quality metrics.

Dynamic load transfer between a host vehicle's wheel assemblies may impact forces on the vehicle's front and rear axles due to longitudinal acceleration and deceleration as follows:

$$F_{z,f} = \frac{mg\ \cos\theta_c\, L_r}{L} - \frac{ma_x h_c}{L}$$

$$F_{z,r} = \frac{mg\ \cos\theta_c\, L_f}{L} + \frac{ma_x h_c}{L}$$

where $F_{z,f}$ is the normal force on a front axle of the host vehicle, $F_{z,r}$ is the normal force on a rear axle of the motor vehicle, $\theta_c$ is the estimated (or adjusted) lateral tilt angle, g is gravity, m is the vehicle's mass, $L_r$ is the distance from the vehicle's center of gravity (CG) to its rear axle, $L_f$ is the distance from the vehicle's CG to its front axle, $h_c$ is a height of the CG, and $a_x$ is a forward acceleration (or deceleration, if negative) of the motor vehicle. Increasing front ride height ($h_f$) shifts vehicle load rearward whereas increasing rear ride height ($h_r$) shifts vehicle load forward. Taking into account front and rear ride heights, the revised normal forces at the host vehicle's front and rear axles may be calculated as:

$$F_{z,f} = \frac{mg\cos\theta_c L_r}{L} - \frac{ma_x h_c}{L} + \frac{mg\Delta h_r}{L}$$

$$F_{z,r} = \frac{mg\cos\theta_c L_f}{L} + \frac{ma_x h_c}{L} - \frac{mg\Delta h_f}{L}$$

Considering lateral load transfer and respective axle loads, a respective normal force at each corner may be calculated as:

$$F_{z,fl} = \left(F_{z,f} - \frac{ma_y h_c}{t}\right)\Big/2$$

$$F_{z,fr} = \left(F_{z,f} + \frac{ma_y h_c}{t}\right)\Big/2$$

$$F_{z,rl} = \left(F_{z,r} - \frac{ma_y h_c}{t}\right)\Big/2$$

$$F_{z,rr} = \left(F_{z,r} + \frac{ma_y h_c}{t}\right)\Big/2$$

where $F_{z,fl}$, $F_{z,fr}$, $F_{z,rl}$ and $F_{z,rl}$ are the respective normal forces on the front-left, front-right, rear-left, and rear-right wheel assemblies of the host vehicle, t is a trackwidth of the roadway segment, and $a_y$ is a lateral acceleration of the motor vehicle.

To help mitigate traction steer, front ride height may be increased (or rear ride height may be lowered) to shift vehicle load rearward to thereby increase traction on the rear axle and tires. Contrariwise, rear ride height may be increased (or front ride height may be lowered) to shift vehicle load forward to thereby increase traction on the front axle and tires. Port-side (left) ride height may be increased to shift load to the starboard-side (right) wheel assemblies, whereas starboard-side ride height may be increased to shift vehicle load to the port-side wheel assemblies. Considering independent ride height control, the respective normal force at each corner may be calculated as:

$$F_{z,fl} = \left(F_{z,f} - \frac{ma_y h_c}{t} + \frac{mg\Delta h_{rr}}{L} - \frac{mg\Delta h_{fl}}{L}\right)\Big/2$$

$$F_{z,fr} = \left(F_{z,f} + \frac{ma_y h_c}{t} + \frac{mg\Delta h_{rr}}{L} - \frac{mg\Delta h_{fr}}{L}\right)\Big/2$$

$$F_{z,rl} = \left(F_{z,r} - \frac{ma_y h_c}{t} + \frac{mg\Delta h_{fl}}{L} - \frac{mg\Delta h_{rl}}{L}\right)\Big/2$$

$$F_{z,rr} = \left(F_{z,r} + \frac{ma_y h_c}{t} + \frac{mg\Delta h_{fr}}{L} - \frac{mg\Delta h_{rr}}{L}\right)\Big/2$$

where $\Delta h_{rr}$ is a change in the respective ride height of the rear-right wheel assembly, $\Delta h_{fl}$ is a change in the respective ride height of the front-left wheel assembly, $\Delta h_{rl}$ is a change in the respective ride height of the rear-left wheel assembly, and $\Delta h_{fr}$ is a change in the ride height of the front-right left wheel assembly.

By considering the estimated normal force calculations and measured steering angle data, lateral forces on the four wheel corners may be calculated as:

$$F_{y,fl} = \mu_s \mu_{x,fl} F_{z,fl} \sin(\theta_f) + \mu_s \mu_{y,fl} F_{z,fl} \cos(\theta_f)$$

$$F_{y,fr} = \mu_s \mu_{x,fr} F_{z,fr} \sin(\theta_f) + \mu_s \mu_{y,fr} F_{z,fr} \cos(\theta_f)$$

$$F_{y,rl} = \mu_s \mu_{x,rl} F_{z,rl} \sin(\theta_r) + \mu_s \mu_{y,rl} F_{z,rl} \cos(\theta_r)$$

$$F_{y,rr} = \mu_s \mu_{x,rr} F_{z,rr} \sin(\theta_r) + \mu_s \mu_{y,rr} F_{z,fr} \cos(\theta_r)$$

where $F_{y,fl}$, $F_{y,fr}$, $F_{y,rl}$ and $F_{y,rl}$ are the respective lateral forces on the front-left, front-right, rear-left, and rear-right wheel assemblies of the host vehicle, $\mu_s$ is the surface road friction coefficient, $\mu_y$ is the normalized lateral force (fl=front left, fr=front right, rl=rear left, rr=rear right), $\mu_x$ is the normalized longitudinal force, $\theta_f$ is the front steering angle, and $\theta_r$ is the rear steering angle. The host vehicle's lateral acceleration and yaw rate can therefore be predicted based on the estimated crown angle and the estimated lateral forces on the wheel corners:

$$a_{y,pred} = (F_{y,fl} + F_{y,fr} + F_{y,rl} + F_{y,rr} + g\sin\theta_c)/m$$

$$r_{pred} = (F_{y,fl}L_f - F_{y,fr}L_r + F_{y,rl}L_r - F_{y,rr}L_r + mgh_{CG}\sin\theta_c)/I_z$$

where $a_{y,pred}$ is the predicted lateral acceleration, $r_{pred}$ is the predicted yaw moment, $\theta_c$ is the estimated (or adjusted) lateral tilt angle, $L_r$ is the fore-aft distance from the vehicle's CG to its rear axle, $L_f$ is the fore-aft distance from the vehicle's CG to its front axle, $F_{y,fl}$, $F_{y,fr}$, $F_{y,rl}$ and $F_{y,rl}$ are the estimated lateral forces on the vehicle's wheel assemblies, and $I_z$ is the host vehicle's moment of inertia.

Using the predicted lateral acceleration and yaw moment values of the forward road segment, FEEDFORWARD CONTROL subroutine 107 may forecast the occurrence of a traction steer event on the roadway segment forward of the motor vehicle (e.g., the predicted lateral acceleration and/or yaw moment exceed their respective preset acceleration/yaw thresholds). Responsive to forecasting traction steer, subroutine 107 may derive a set of vehicle-calibrated control actions that are customized-singly or collectively—to redress the specific traction steer event. An optimization function may be performed to minimize respective discrepancies between desired acceleration/yaw values and predicted acceleration/yaw values with minimal control action as follows. By way of non-limiting example, the mathematical optimization function for calculating the vehicle control action may include:

$$J = \sum \min\Big( \|a_{y,pred} - a_{y,des}\|^2_{W_{a_y}} + \|r_{pred} - r_{des}\|^2_{W_r} + \|\Delta h_{fl}\|^2_{W_{\Delta h_{fl}}} + \|\Delta h_{fr}\|^2_{W_{\Delta h_{fr}}} + \|\Delta h_{rl}\|^2_{W_{\Delta h_{rl}}} + \|\Delta h_{frr}\|^2_{W_{\Delta h_{rr}}} \Big)$$

which is subject to the following set of constraints:

$$\Delta h_{min} \leq \Delta h_{fl}, \Delta h_{fr}, \Delta h_{rl}, \Delta h_{rr} \leq \Delta h_{max} \text{ (physical ride height limits), and}$$

$$|\Delta h_{fl} - \Delta h_{rl}|, |\Delta h_{fr} - \Delta h_{rr}|, |\Delta h_{fl} - \Delta h_{fr}|,$$

$$|\Delta h_{rl} - \Delta h_{rr}| \leq \text{max asymmetry constraints (roll and pitch)}$$

and where $a_{y,des}$ is the desired lateral acceleration, $r_{des}$ is the desired yaw moment, and $W_{a_y}$' $W_r$, $W_{\Delta h_{fl}}$, $W_{\Delta h_{fr}}$, $W_{\Delta h_{rl}}$, $W_{\Delta h_{rr}}$ are respective cost-function weights associated with lateral acceleration, yaw rate, and ride heights in the front-left, front-right, rear-left, and rear-right wheel assemblies in the objective function.

As noted above in the discussion of subroutine 105 of FIG. 2 and vehicle architecture 200 of FIG. 3, fusion logic may be implemented to arbitrate a lateral tilt angle estimate from IMU and steering rack system data for real-time adaptation of the angle estimate. The adapted lateral tilt angle may be utilized by FEEDBACK CONTROL subroutine 109 to minimize inadvertent deviations from desired lateral and yaw motions. For instance, FEEDBACK CONTROL subroutine 109 may utilize active suspension ride-height control, adjustable wheel camber angles, and adaptable steer-by-wire steering angle control features to selectively transfer vehicle load from one axle to the other axle and/or from one vehicle side to the other. In so doing, vehicle lateral acceleration and yaw moments are governed through lateral force generation and corrective camber and steering angle(s). The steering angle rectification and camber angle correction may assist with handling control on crown and banked roads, which may produce undesired lateral acceleration and yaw motion during a traction steer event. This may be achieved through an optimization algorithm that is implemented in real-time by utilizing a reference control action (e.g., ride height change at each corner) and an additional control action (e.g., front and/or rear steering angle offset) to minimize any discrepancies between vehicle desired and actual lateral and yaw motions. The optimization algorithm may be subjective to practical constraints, such as limitations of physical movement of the steering actuator in the front and rear axles.

For feedback control through tire camber and road wheel steering angle modulation, lateral forces on the four wheel corners may be calculated as:

$$F_{y_{fl}} = \mu_s \mu_{y,fl} F_{z,fl,c} + \overline{C}_{\alpha f} \Delta\alpha_f + \overline{C}_{\gamma f} \Delta\gamma_{fl}$$

$$F_{y_{fr}} = \mu_s \mu_{y,fl} F_{z,fr,c} + \overline{C}_{\alpha f} \Delta\alpha_f + \overline{C}_{\gamma f} \Delta\gamma_{fr}$$

$$F_{y_{rl}} = \mu_s \mu_{y,rl} F_{z,rl,c} + \overline{C}_{\alpha r} \Delta\alpha_r + \overline{C}_{\gamma f} \Delta\gamma_{rl}$$

$$F_{y_{rr}} = \mu_s \mu_{y,rr} F_{z,rr,c} + \overline{C}_{\alpha r} \Delta\alpha_r + \overline{C}_{\gamma r} \Delta\gamma_{rr}$$

where $F_{y,fl}$, $F_{y,fr}$, $F_{y,rl}$ and $F_{y,rl}$ are the respective lateral forces on the front-left, front-right, rear-left, and rear-right wheel assemblies of the host vehicle, $\overline{C}_{\alpha f}$ is a front cornering coefficient, $\overline{C}_{\gamma f}$ is a front camber coefficient, $C_{\alpha r}$ is a rear cornering coefficient, $\overline{C}_{\gamma f}$ is a rear camber coefficient, $\alpha_f$ is a front lateral slip angle, $\alpha_r$ is a rear lateral slip angle, $\gamma_{rl}$ is a front-left camber angle, $\gamma_{fr}$ is a front-right camber angle, $\gamma_{rl}$ is a rear-left camber angle, and $\gamma_{rr}$ is a rear-right camber angle. In this example, front and rear slip values $\Delta\alpha_f$ and $\Delta\alpha_r$ may be calculated as:

$$\Delta\alpha_f = \left(\frac{v_y + L_f r}{v_x} - \delta_f\right) - \left(\frac{v_y + L_f r}{v_x} - (\delta_f + \Delta\delta_f)\right)$$

$$\Delta\alpha_r = \left(\frac{v_y + L_r r}{v_x} - \delta_r\right) - \left(\frac{v_y + L_r r}{v_x} - (\delta_r + \Delta\delta_r)\right)$$

as a function of a longitudinal vehicle speed $v_x$, a vehicle lateral speed $v_y$, a front steering angle $\delta_f$, and a rear steering angle $\delta_r$.

An objective function for minimizing undesired lateral acceleration and yaw moment caused by traction steer may be calculated as:

$$J = \sum \min\Big( \|a_y - a_{y,des}\|^2_{W_{a_y}} + \|r - r_{des}\|^2_{W_r} + \|\Delta h_{fl} - \Delta h_{fl,ref}\|^2_{W_{\Delta h_{fl}}} + \|\Delta h_{fr} - \Delta h_{fr,ref}\|^2_{W_{\Delta h_{fr}}} + \|\Delta h_{rl} - \Delta h_{rl,ref}\|^2_{W_{\Delta h_{rl}}} + \|\Delta h_{frr} - \Delta h_{frr,ref}\|^2_{W_{\Delta h_{rr}}} + \|\Delta\delta_f\|^2_{W_{\Delta\delta_f}} + \|\Delta\delta_r\|^2_{W_{\Delta\delta_r}} + \|\Delta\gamma_{fl}\|^2_{W_{\Delta\gamma_{fl}}} + \|\Delta\gamma_{fr}\|^2_{W_{\Delta\gamma_{fr}}} + \|\Delta\gamma_{rl}\|^2_{W_{\Delta\gamma_{rl}}} + \|\Delta\gamma_{rr}\|^2_{W_{\Delta\gamma_{rr}}} \Big)$$

which may be subject to the following constraints:

$$\Delta\delta_{f,min} \leq \Delta\delta_f \leq \Delta\delta_{f,max} \text{ (physical front steering road angle limits)}$$

$$\Delta\delta_{r,min} \leq \Delta\delta_r \leq \Delta\delta_{r,max} \text{ (physical rear steering road angle limits)}$$

$$\Delta h_{min} \leq \Delta h_{fl}, \Delta h_{fr}, \Delta h_{rl}, \Delta h_{rr} \leq \Delta h_{max} \text{ (physical ride height limits)}$$

$$\Delta\gamma_{min} \leq \Delta\gamma_{fl}, \Delta\gamma_{fr}, \Delta\gamma_{rl}, \Delta\gamma_{rr} \leq \Delta\gamma_{max} \text{ (physical ride height limits)}$$

$$|\Delta h_{fl} - \Delta h_{rl}|, |\Delta h_{fr} - \Delta h_{rr}|, |\Delta h_{fl} - \Delta h_{fr}|,$$

$$|\Delta h_{rl} - \Delta h_{rr}| \leq \text{max asymmetry constraint (pitch and roll)}$$

$$|\Delta\gamma_{fl} - \Delta\gamma_{fr}|, |\Delta\gamma_{rl} - \Delta\gamma_{rr}| \leq \text{max asymmetry constraint (handling)}$$

where $W_{\Delta S_f}=0$ represents a vehicle configuration that only has a rear steer-by-wire available and $W_{\Delta\delta_r}=0$ represents a vehicle configuration that only has a front steer-by-wire available. The same logic may be applied to a vehicle equipped with an active camber system: if an active camber actuator is not available on a subject vehicle configuration, the corresponding weights are set to zero ($W_{\Delta\gamma_{fl}}=W_{\Delta\gamma_{fr}}=W_{\Delta\gamma_{rl}}=W_{\Delta\gamma_{rr}}=0$). Once derived, the desired control action commands may be output to the desired vehicle subsystem-SBW, ARH and AWC—to effect one or more vehicle control actions designed to redress the traction steer event, at VEHICLE CONTROL ACTION subroutine 111. Method 100 of FIG. 2 may thereafter advance to END terminal block 113 and temporarily terminate or, optionally, may loop back to terminal block 101 and run in a continuous loop.

While traveling across a crowned or banked roadway, a host vehicle may experience what is referred to as "tramlining" in which the vehicle may have a tendency to follow the contours and unevenness of the road surface, rather than the driver's steering input. Tramlining is often exacerbated by ruts or grooves in the vehicle surface, wide high-performance and low-profile tires, and vehicles with large wheelbases. Disclosed control system architectures for traction steer prediction and mitigation may also be used to mollify a tramlining event through active vehicle SBW control and adaptive suspension ride-height and camber angle modulation to counteract the forces caused by tramlining.

Attendant benefits for at least some of the disclosed features may include improved vehicle stability and handling through mitigation of unwanted lateral and moment forces that are caused by traction steer. Doing so may help to ensure a more predictable and stable driving experience while also reducing driver steering overcorrections and, thus, helping to enhance confidence and ease of control. Other attendant benefits may include enhanced torque steer compensation through actively counteracting torque steer effects by coordinating front (and, where available, rear) steer-by-wire adjustments. This may help to improve straight-line vehicle acceleration performance, particularly in high-power front-wheel drive (FWD) and all-wheel drive (AWD) vehicle applications. Optimized vehicle response on uneven and banked roadways may be achieved by compensating for road crown/bank angles and varying friction conditions through dynamic adjustments to steering angles and ride heights. This may help to enhance lateral acceleration and yaw stability under asymmetric grip conditions. Additional benefits may include improved ride and comfort using active suspension control to automate individualized adjustments to wheel corner ride heights to optimize normal force distribution across the vehicle axles and wheels and thereby improve traction and reduce unwanted lateral forces. Doing so may help to enhance ride comfort by minimizing disturbances transmitted to the steering system.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle with a vehicle controller, a vehicle body, and multiple wheel assemblies rotatably attached to the vehicle body, the method comprising:

estimating, via the vehicle controller using a digital road map and/or a camera module attached to the vehicle body, a lateral tilt angle of a roadway segment forward of the motor vehicle;

predicting, via the vehicle controller, a predicted lateral acceleration and a predicted yaw moment of the roadway segment using the lateral tilt angle and respective lateral forces on the wheel assemblies;

forecasting, via the vehicle controller, a traction steer event on the roadway segment forward of the motor vehicle when the predicted lateral acceleration exceeds a preset acceleration threshold and/or the predicted yaw moment exceeds a preset yaw threshold;

calculating, via the vehicle controller responsive to forecasting the traction steer event, a vehicle control action using a mathematical optimization function that minimizes a first discrepancy between the predicted lateral acceleration and a desired lateral acceleration and a second discrepancy between the predicted yaw moment and a desired yaw moment; and commanding, via the vehicle controller responsive to forecasting the traction steer event, an automated steer-by-wire (SBW) system, an adjustable ride-height (ARH) system, and/or an adaptive wheel camber (AWC) system attached to the vehicle body of the motor vehicle to perform the vehicle control action configured to redress the traction steer event.

2. The method of claim 1, wherein estimating the lateral tilt angle includes:

detecting lane markings in a digital image of the roadway segment captured by the camera module;

converting pixel coordinates of the lane markings in the digital image into world coordinates using an inverse perspective mapping (IPM) computer vision technique; and fitting a parabolic equation to the world coordinates of the lane markings, the parabolic equation defining a coefficient of curvature a based on a lateral coordinate x and a vertical coordinate y in the world coordinates.

3. The method of claim 2, wherein estimating the lateral tilt angle further includes calculating the lateral tilt angle as $\theta_c$ where:

$$\theta_c = \tan^{-1}\left(\frac{dx}{dz}\right)$$

where dx is a lateral displacement increment of a lane midpoint of the roadway segment, and dz is a vertical displacement increment of the roadway segment.

4. The method of claim 3, wherein estimating the lateral tilt angle of the roadway segment further includes fusing the lateral tilt angle $\theta_c$ with road curvature data of the roadway segment contained in the digital road map using a Kalman filter.

5. The method of claim 4, wherein the mathematical optimization function for calculating the vehicle control action includes:

$$J = \sum \min\Big(\|a_{y,pred} - a_{y,des}\|^2_{W_{a_y}} + \|r_{pred} - r_{des}\|^2_{W_r} + \|\Delta h_{fl}\|^2_{W_{\Delta h_{fl}}} + \|\Delta h_{fr}\|^2_{W_{\Delta h_{fr}}} + \|\Delta h_{rl}\|^2_{W_{\Delta h_{rl}}} + \|\Delta h_{frr}\|^2_{W_{\Delta h_{rr}}}\Big)$$

and is subject to constraints:

$$\Delta h_{min} \le \Delta h_{fl}, \Delta h_{fr}, \Delta h_{rl}, \Delta h_{rr} \le \Delta h_{max} \text{ (physical ride height limits), and}$$

$$|\Delta h_{fl} - \Delta h_{rl}|, |\Delta h_{fr} - \Delta h_{rr}|, |\Delta h_{fl} - \Delta h_{fr}|, |\Delta h_{rl} - \Delta h_{rr}| \le \text{max asymmetry constraints (roll and pitch)}$$

where $a_{y,des}$ is the desired lateral acceleration, $r_{des}$ is the desired yaw moment, and $W_{a_y}$, $W_r$, $W_{\Delta h_{fl}}$, $W_{\Delta h_{fr}}$, $W_{\Delta h_{rl}}$, $W_{\Delta h_{rr}}$ are weights associated with lateral acceleration, yaw rate, and respective ride heights in front-left, front-right, rear-left, and rear-right wheel assemblies, respectively.

6. The method of claim 1, wherein predicting the predicted lateral acceleration and the predicted yaw moment includes calculating the predicted lateral acceleration as $a_{y,pred}$ and calculating the predicted yaw moment as $r_{pred}$ where:

$$a_{y,pred} = (F_{y,fl} + F_{y,fr} + F_{y,rl} + F_{y,rr} + g\sin\theta_c)/m$$

$$r_{pred} = (F_{y,fl}L_f - F_{y,fr}L_r + F_{y,rl}L_r - F_{y,rr}L_r + mgh_{CG}\sin\theta_c)/I_z$$

where $\theta_c$ is the lateral tilt angle, g is gravity, m is a vehicle mass of the motor vehicle, $L_r$ is a first distance from a center of gravity (CG) of the motor vehicle to a rear axle of the motor vehicle, $L_f$ is a second distance from the CG to a front axle of the motor vehicle, $F_{y,fl}$, $F_{y,fr}$, $F_{y,rl}$ and $F_{y,rl}$ are first, second, third and fourth lateral forces of front-left, front-right, rear-left, and rear-right wheels of the wheel assemblies of the motor vehicle, $h_{CG}$ is a height of the CG, and $I_z$ is a moment of inertia of the motor vehicle.

7. The method of claim 1, further comprising calculating a first normal force Faf of a front axle of the motor vehicle and a second normal force $F_{z,r}$ of a rear axle of the motor vehicle as:

$$F_{z,f} = \frac{\text{mg}\cos\theta_c L_r}{L} - \frac{ma_x h_c}{L}$$

$$F_{z,r} = \frac{\text{mg}\cos\theta_c L_f}{L} + \frac{ma_x h_c}{L}$$

where $\theta_c$ is the lateral tilt angle, g is gravity, m is a vehicle mass of the motor vehicle, $L_r$ is a first distance from a center of gravity (CG) of the motor vehicle to a rear axle of the motor vehicle, $L_f$ is a second distance from the CG to a front axle of the motor vehicle, $h_c$ is a height of the CG, and $a_x$ is a forward acceleration of the motor vehicle.

8. The method of claim 7, further comprising calculating first, second, third and fourth normal forces $F_{z,fl}$, $F_{z,fr}$, $F_{z,rl}$ and $F_{z,rl}$, respectively, of front-left, front-right, rear-left, and rear-right wheel assemblies of the motor vehicle as:

$$F_{z,fl} = \left(F_{z,f} - \frac{ma_y h_c}{t}\right)\Big/2$$

$$F_{z,fr} = \left(F_{z,f} + \frac{ma_y h_c}{t}\right)\Big/2$$

$$F_{z,rl} = \left(F_{z,r} - \frac{ma_y h_c}{t}\right)\Big/2$$

$$F_{z,rr} = \left(F_{z,r} + \frac{ma_y h_c}{t}\right)\Big/2$$

where t is a trackwidth of the roadway segment, and $a_y$ is a lateral acceleration of the motor vehicle.

9. The method of claim 1, further comprising calculating first, second, third and fourth lateral forces $F_{y,fl}$, $F_{y,fr}$, $F_{y,rl}$ and $F_{y,rl}$ of front-left, front-right, rear-left, and rear-right wheels of the wheel assemblies of the motor vehicle as:

$$F_{y_{fl}} = \mu_s \mu_{y,fl} F_{z,fl,c} + \overline{C}_{\alpha f}\Delta\alpha_f + \overline{C}_{\gamma f}\Delta\gamma_{fl}$$

$$F_{y_{fr}} = \mu_s \mu_{y,fr} F_{z,fr,c} + \overline{C}_{\alpha f}\Delta\alpha_f + \overline{C}_{\gamma f}\Delta\gamma_{fr}$$

$$F_{y_{rl}} = \mu_s \mu_{y,rl} F_{z,rl,c} + \overline{C}_{\alpha r}\Delta\alpha_r + \overline{C}_{\gamma r}\Delta\gamma_{rl}$$

$$F_{y_{rr}} = \mu_s \mu_{y,rr} F_{z,rr,c} + \overline{C}_{\alpha r}\Delta\alpha_r + \overline{C}_{\gamma r}\Delta\gamma_{rr}$$

where $\overline{C}_{\alpha f}$ is a front cornering coefficient, $\overline{C}_{\gamma f}$ is a front camber coefficient, $\overline{C}_{\alpha r}$ is a rear cornering coefficient, $\overline{C}_{\gamma r}$ is a rear camber coefficient, $\alpha_f$ is a front lateral slip angle, $\alpha_r$ is a rear lateral slip angle, $\gamma_{fl}$ is a front left camber angle, $\gamma_{fr}$ is a front right camber angle, $\gamma_{rl}$ is a rear left camber angle, and $\gamma_{rr}$ is a rear right camber angle.

10. The method of claim 1, further comprising:

calculating a first estimated lateral tilt angle using inertial measurement unit (IMU) data received from an IMU device attached to the vehicle body;

calculating a second estimated lateral tilt angle using rack force data received from load sensor of a steering rack of the motor vehicle; and calculating an adjusted lateral tilt angle based on a weighted cross error calculation of the lateral tilt angle, the first estimated lateral tilt angle, and the second estimated lateral tilt angle.

11. The method of claim 10, further comprising calculating a front slip $\Delta\alpha_f$ of a front axle of the motor vehicle and a rear slip $\Delta\alpha_r$ of a rear axle of the motor vehicle as:

$$\Delta\alpha_f = \left(\frac{v_y + L_f r}{v_x} - \delta_f\right) - \left(\frac{v_y + L_f r}{v_x} - (\delta_f + \Delta\delta_f)\right)$$

$$\Delta\alpha_r = \left(\frac{v_y - L_r r}{v_x} - \delta_r\right) - \left(\frac{v_y - L_r r}{v_x} - (\delta_r + \Delta\delta_r)\right)$$

where $v_x$ is a longitudinal speed, $v_y$ is a lateral speed, $\delta_f$ is a front steering angle, and $\delta_r$ is a rear steering angle.

12. The method of claim 11, wherein the mathematical optimization function for calculating the vehicle control action includes:

$$J = \sum \min\Big(\|a_y - a_{y,des}\|^2_{W_{a_y}} + \|r - r_{des}\|^2_{W_r} + \|\Delta h_{fl} - \Delta h_{fl,ref}\|^2_{W_{\Delta h_{fl}}} + \|\Delta h_{fr} - \Delta h_{fr,ref}\|^2_{W_{\Delta h_{fr}}} + \|\Delta h_{rl} - \Delta h_{rl,ref}\|^2_{W_{\Delta h_{rl}}} + \|\Delta h_{frr} - \Delta h_{frr,ref}\|^2_{W_{\Delta h_{rr}}} + \|\Delta\delta_f\|^2_{W_{\Delta\delta_f}} + \|\Delta\delta_r\|^2_{W_{\Delta\delta_r}} + \|\Delta\gamma_{fl}\|^2_{W_{\Delta\gamma_{fl}}} + \|\Delta\gamma_{fr}\|^2_{W_{\Delta\gamma_{fr}}} + \|\Delta\gamma_{rl}\|^2_{W_{\Delta\gamma_{rl}}} + \|\Delta\gamma_{rr}\|^2_{W_{\Delta\gamma_{rr}}}\Big)$$

and is subject to constraints:

$$\Delta\delta_{f,min} \le \Delta\delta_f \le \Delta\delta_{f,max} \text{ (physical front steering road angle limits)}$$

$$\Delta\delta_{r,min} \le \Delta\delta_r \le \Delta\delta_{r,max} \text{ (physical rear steering road angle limits)}$$

$$\Delta h_{min} \le \Delta h_{fl}, \Delta h_{fr}, \Delta h_{rl}, \Delta h_{rr} \le \Delta h_{max} \text{ (physical ride height limits)}$$

$$\Delta\gamma_{min} \le \Delta\gamma_{fl}, \Delta\gamma_{fr}, \Delta\gamma_{rl}, \Delta\gamma_{rr} \le \Delta\gamma_{max} \text{ (physical ride height limits)}$$

$$|\Delta h_{fl} - \Delta h_{rl}|, |\Delta h_{fr} - \Delta h_{rr}|, |\Delta h_{fl} - \Delta h_{fr}|, |\Delta h_{rl} - \Delta h_{rr}| \le \text{max asymmetry constraint (pitch and roll)}$$

$$|\Delta\gamma_{fl} - \Delta\gamma_{fr}|, |\Delta\gamma_{rl} - \Delta\gamma_{rr}| \le \text{max asymmetry constraint (handling)}$$

where $W_{\Delta\delta_f}=0$ when the motor vehicle has only a rear steer-by-wire system, and $W_{\Delta\delta_r}=0$ when the motor vehicle has only a front steer-by-wire system.

13. The method of claim 1, wherein the vehicle control action includes:

- the ARH system modifying respective ride heights on the wheel assemblies to transfer vehicle load from one of the wheel assemblies to another of the wheel assemblies;
- the SBW system applying a steering angle correction to a steering angle of the wheel assemblies; and/or
- the AWC system applying respective camber angle corrections to respective camber angles of the wheel assemblies.

14. A non-transient, computer-readable medium storing instructions executable by a vehicle controller of a motor vehicle having a vehicle body and multiple wheel assemblies rotatably attached to the vehicle body, the instructions, when executed, causing the vehicle controller to perform operations comprising:

- estimating, using a digital road map and/or a camera module attached to the vehicle body, a lateral tilt angle of a roadway segment forward of the motor vehicle;
- predicting a predicted lateral acceleration and a predicted yaw moment of the roadway segment using the lateral tilt angle and respective lateral forces on the wheel assemblies;
- forecasting a traction steer event on the roadway segment forward of the motor vehicle when the predicted lateral acceleration exceeds a preset acceleration threshold and/or the predicted yaw moment exceeds a preset yaw threshold;
- calculating, responsive to forecasting the traction steer event, a vehicle control action configured to redress the traction steer event using a mathematical optimization function that minimizes a first discrepancy between the predicted lateral acceleration and a desired lateral acceleration and a second discrepancy between the predicted yaw moment and a desired yaw moment; and
- commanding, responsive to forecasting the traction steer event, an automated steer-by-wire (SBW) system, an adjustable ride-height (ARH) system, and/or an adaptive wheel camber (AWC) system of the motor vehicle to perform the vehicle control action.

15. A motor vehicle, comprising:

- a vehicle body including a passenger cabin;
- a plurality of wheel assemblies attached to the vehicle body;
- an automated steer-by-wire (SBW) system attached to the vehicle body and configured to modify a steering angle of the wheel assemblies;
- an adjustable ride-height (ARH) system attached to the vehicle body and configured to modify a respective ride height of each of the wheel assemblies;
- an adaptive wheel camber (AWC) system attached to the vehicle body and configured to modify a respective camber angle of each of the wheel assemblies; and
- a vehicle controller programmed to:
  - estimate a lateral tilt angle of a roadway segment forward of the motor vehicle using a digital road map and/or a camera module attached to the vehicle body;
  - determine a respective lateral force on each of the wheel assemblies;
  - predict a predicted lateral acceleration and a predicted yaw moment of the roadway segment using the lateral tilt angle and the respective lateral forces on the wheel assemblies;
  - forecast a traction steer event on the roadway segment forward of the motor vehicle when the predicted lateral acceleration exceeds a preset acceleration threshold and/or the predicted yaw moment exceeds a preset yaw threshold;
  - responsive to forecasting the traction steer event, calculate a vehicle control action configured to redress the traction steer event using a mathematical optimization function that minimizes a first discrepancy between the predicted lateral acceleration and a desired lateral acceleration and a second discrepancy between the predicted yaw moment and a desired yaw moment; and
  - responsive to forecasting the traction steer event, command the SBW system, the ARH system, and/or the AWC system to perform the vehicle control action.

16. The motor vehicle of claim 15, wherein estimating the lateral tilt angle includes:

- detecting lane markings in a digital image of the roadway segment captured by the camera module;
- converting pixel coordinates of the lane markings in the digital image into world coordinates using an inverse perspective mapping (IPM) computer vision technique; and
- fitting a parabolic equation to the world coordinates of the lane markings, the parabolic equation defining a coefficient of curvature a based on a lateral coordinate x and a vertical coordinate y.

17. The motor vehicle of claim 16, wherein estimating the lateral tilt angle further includes calculating the lateral tilt angle as $\theta_c$ where:

$$\theta_c = \tan^{-1}\left(\frac{dx}{dz}\right)$$

where dx is a lateral displacement increment of a lane midpoint of the roadway segment, and dz is a vertical displacement increment of the roadway segment.

18. The motor vehicle of claim 15, wherein predicting the predicted lateral acceleration and the predicted yaw moment includes calculating the predicted lateral acceleration as $a_{y,pred}$ and calculating the predicted yaw moment as $r_{pred}$ where:

$$a_{y,pred} = (F_{y,fl} + F_{y,fr} + F_{y,rl} + F_{y,rr} + g\sin\theta_c)/m$$

$$r_{pred} = (F_{y,fl}L_f - F_{y,fr}L_r + F_{y,rl}L_r - F_{y,rr}L_r + mgh_{CG}\sin\theta_c)/I_z$$

where $\theta_c$ is the lateral tilt angle, g is gravity, m is a vehicle mass of the motor vehicle, $L_r$ is a first distance from a center of gravity (CG) of the motor vehicle to a rear axle of the motor vehicle, $L_f$ is a second distance from the CG to a front axle of the motor vehicle, $F_{y,fl}$, $F_{y,fr}$, $F_{y,rl}$ and $F_{y,rl}$ are first, second, third and fourth lateral forces of front-left, front-right, rear-left, and rear-right wheels of the wheel assemblies of the motor vehicle, $h_{CG}$ is a height of the CG, and $I_z$ is a moment of inertia of the motor vehicle.

19. The motor vehicle of claim 18, wherein the mathematical optimization function for calculating the vehicle control action includes:

$$J = \sum \min\Big(\|a_{y,pred} - a_{y,des}\|^2_{W_{a_y}} + \|r_{pred} - r_{des}\|^2_{W_r} + \|\Delta h_{fl}\|^2_{W_{\Delta h_{fl}}} + \|\Delta h_{fr}\|^2_{W_{\Delta h_{fr}}} + \|\Delta h_{rl}\|^2_{W_{\Delta h_{rl}}} + \|\Delta h_{frr}\|^2_{W_{\Delta h_{rr}}}\Big)$$

and is subject to constraints:

$$\Delta h_{min} \le \Delta h_{fl}, \Delta h_{fr}, \Delta h_{rl}, \Delta h_{rr} \le \Delta h_{max} \text{ (physical ride height limits), and}$$

$$|\Delta h_{fl} - \Delta h_{rl}|, |\Delta h_{fr} - \Delta h_{rr}|, |\Delta h_{fl} - \Delta h_{fr}|, |\Delta h_{rl} - \Delta h_{rr}| \le \text{max asymmetry constraints (roll and pitch)}$$

where $a_{y,des}$ is the desired lateral acceleration, $r_{des}$ is the desired yaw moment, and $W_{a_y}$, $W_r$, $W_{\Delta h_{fl}}$, $W_{\Delta h_{fr}}$, $W_{\Delta h_{rl}}$, $W_{\Delta h_{rr}}$ are weights associated with lateral acceleration, yaw rate, and respective ride heights in front-left, front-right, rear-left, and rear-right wheel assemblies, respectively.

20. The motor vehicle of claim 15, wherein the vehicle control action includes:

the ARH system modifying respective ride heights on the wheel assemblies to transfer vehicle load from one of the wheel assemblies to another of the wheel assemblies;

the SBW system applying a steering angle correction to a steering angle of the wheel assemblies; and/or the AWC system applying respective camber angle corrections to respective camber angles of the wheel assemblies.

* * * * *